United States Patent [19]
Woodward, Jr.

[11] Patent Number: 6,066,908
[45] Date of Patent: May 23, 2000

[54] DISC-TYPE BRUSHLESS ALTERNATOR

[76] Inventor: Richard C. Woodward, Jr., 1119 Oakdale, Fullerton, Calif. 92831

[21] Appl. No.: 09/152,305

[22] Filed: Sep. 14, 1998

[51] Int. Cl.[7] ...................................................... H02K 1/06
[52] U.S. Cl. ............................ 310/268; 310/216; 310/263
[58] Field of Search ..................................... 310/268, 164, 310/181, 263, 156, 191, 216

[56] References Cited

U.S. PATENT DOCUMENTS

| | | | |
|---|---|---|---|
| 2,193,406 | 3/1940 | Goss | 310/191 |
| 3,296,475 | 1/1967 | Parker | 310/268 |
| 3,304,450 | 2/1967 | Bosco | 310/156 |
| 5,093,596 | 3/1992 | Hammer | 310/191 |
| 5,177,392 | 1/1993 | Scott | 310/268 |
| 5,554,900 | 9/1996 | Pop | 310/156 |
| 5,777,421 | 7/1998 | Woodward | 310/268 |

*Primary Examiner*—Clayton LaBalle
*Attorney, Agent, or Firm*—Cleveland R. Williams

[57] ABSTRACT

The present invention resides in an improved disc-type brushless alternator which contains an alternator housing, a shaft rotatably attached to the alternator housing, a plurality of rotors and a pulley at one end. The alternator housing is attached to a stator. The rotors and stators have serrated surfaces wherein the serrated surfaces of said rotors and stators face each other and define an axial air gap there between.

2 Claims, 4 Drawing Sheets

DISC-TYPE BRUSHLESS ALTERNATOR

BACKGROUND OF THE INVENTION

1. Field of the Invention

This invention resides in an improved disc-type brushless alternator having increased efficiency and reduction in energy loss, for example electricity. The alternator has increased surface area with surfaces not perpendicular to or in line with the axis of said alternator. The alternator has a reduced air gap loss with the increased surface area of the portion of said rotors and stators which face each other. It should be noted that the disc-type brushless alternators herein may contain a plurality of rotors and stators. This improved disc-type brushless alternators when having an air gap defined by serrated surface areas on the rotors and stators, have reduced magnetic pull on the bearings because of the different angles on the stator and rotor surfaces.

In induction type machines, the power output of said machines depends upon a produced magnetic flux that crosses an air gap between a rotor and stator contained in said machine.

In a disc-type brushless alternator, EMF produced by said machine is directly proportional to the power transferred by rotating fluxes produced between rotors and stators contained in said machine and having air gaps there between. If the air gaps or the air gap flux densities between the surface areas of the rotors and stators are too large, a large loss in ampere turns is noted and the field coil will have sufficient currents and turns.

In the past, others have tried to solve the energy loss across the air gap in disc-type machines by increasing the rotor and stator outside diameters, and by increasing the length of the rotor and stator sections for cylindrical air gap machines. These two approaches have the disadvantage of requiring a larger machine.

In the alternative, cylindrical air gap machines have used slip rings with brushes and brush holders to conduct current to the field coil. This type machine suffers from the disability of having a voltage drop across the brushes during use. The brushes in these types of machines also have a limited life due to the wear on the rotating slip rings.

2. Description of the Prior Art

Numerous attempts have been made in the past to increase the efficiency and reduce the energy consumption of disc-type electric machines.

For example, U.S. Pat. No. 3,296,475 to Parker relates to dynamo-electric machines, and rotors therefor. In particular, the patent describes an axial air gap machine having a lower rotor resistance thereby reducing power losses in said machine.

U.S. Pat. No. 3,304,450 to Bask, Jr., et al., describes an axial air gap dynamoelectric machine, wherein said machine is brushless and contains a rotor spaced apart from a stator armature by an axial air gap. A rotor disc, as described above, has at least one of its sides juxtaposed to a stator core provided with an armature winding with a narrow axial air gap between the faces of the stator and of the rotor.

U.S. Pat. No. 3,581,389 to Mori, et al., discloses a method for producing a magnetic core for an electric rotating machine which has an axially spaced air gap as in the case of a disc-type rotating machine.

U.S. Pat. No. 4,207,487 to Beyersdorf describes a disc-type, dynamo-electric machine having two stators and one rotor, active air gaps between each stator and the rotor, two annular energizing windings in the stators, and two non-active or auxiliary air gaps formed in a smooth region between the stators and the rotor.

U.S. Pat. No. 5,093,596 to Hammer relates to a combined linear-rotary direct drive step motor which provides both linear and rotary motion over a predefined range, e.g. along a portion of the longitudinal axis of the rotor shaft. The rotor and stator of the rotary step motor are described as having teeth.

U.S. Pat. No. 5,177,392 to Scott discloses a disc-type machine having a plurality of alternating stator and/or rotor sections. The stator has micro-laminated stator teeth molded from cut steel particles, mounted on a large disc of composite fiber material which is the main structure component of each stator section.

U.S. Pat. No. 5,777,421 to Woodward Jr. teaches a disc-type electrical machine having enhanced efficiency and effectiveness. The machine comprises a housing unit, a stator connected to said housing unit, a shaft rotatably connected to the stator housing unit with rotation means. A rotator connected to the shaft wherein the stator surface area and the rotor surface area are serrated.

As can readily be determined from the foregoing there is an ongoing research effort and a need to develop and produce new and novel disc-type electric motors that have increased efficiency, is economical and easy to manufacture.

SUMMARY OF THE INVENTION

The present invention resides in an improved disc-type brushless alternator containing rotors and stators having air gap flux with increased surface area. The alternator comprises a housing section containing a shaft connected to the housing with rotation means, a stator section attached to the housing and rotor sections attached to the shaft, wherein each of said rotor sections and stator section have serrated face areas which define the axial air gap between the rotor sections and stator section. The stator section has two serrated face areas opposite each other and each serrated face areas have opposite magnetic polarities. A pulley is attached to one end of the shaft to provide the driving force for the shaft rotation means.

DETAILED DESCRIPTION OF THE INVENTION

This invention resides in a disc-type brushless alternator having increased efficiency and longer life.

At present many 40 amp, 60 amp and higher amp alternators are used in automobiles to keep the batteries charged. Most of these alternators have a three phase electrical output that is changed to 12 Volt DC by a three phase bridge made up of six rectifiers. The prior art alternators also contain brushes and rotating slip rings to conduct current to the field coil. Wear on these brushes over a period of time cause a net drop in electricity produced.

These and other problems are solved by the disc-type brushless alternators herein which contain rotor sections and a stator section which contain serrated surfaces which define an axial air gap there between. These alternators do not contain brushes or slip rings, they have wires going through the stator section to the field coil. They weigh less, are easier to manufacture and cost less than today's conventional alternators which contain brushes and slip rings.

The disc-type brushless alternators herein comprise a housing with two sections. A shaft with rotation means is attached to the housing wherein a stator section is connectably attached to the housing and two rotor sections are connectably attached to the shaft.

The surfaces of the stators and rotors face each other and have serrated surface areas. The serrated surface areas of the stators and rotors increase the surface areas of up to two hundred percent (200%) each without increasing the pole material or size of said rotors or stators.

Another benefit of having serrated surfaces of the rotor and stator, resides in the fact that the axial air gap surfaces thereof are no longer parallel to the unit axis, which results in a net reduction of magnetic pull in the unit.

The increased surface area of the rotor and stator, provided that the axial air gap is not somehow increased, results in a reduction of the axial air gap flux density.

Figure 1:
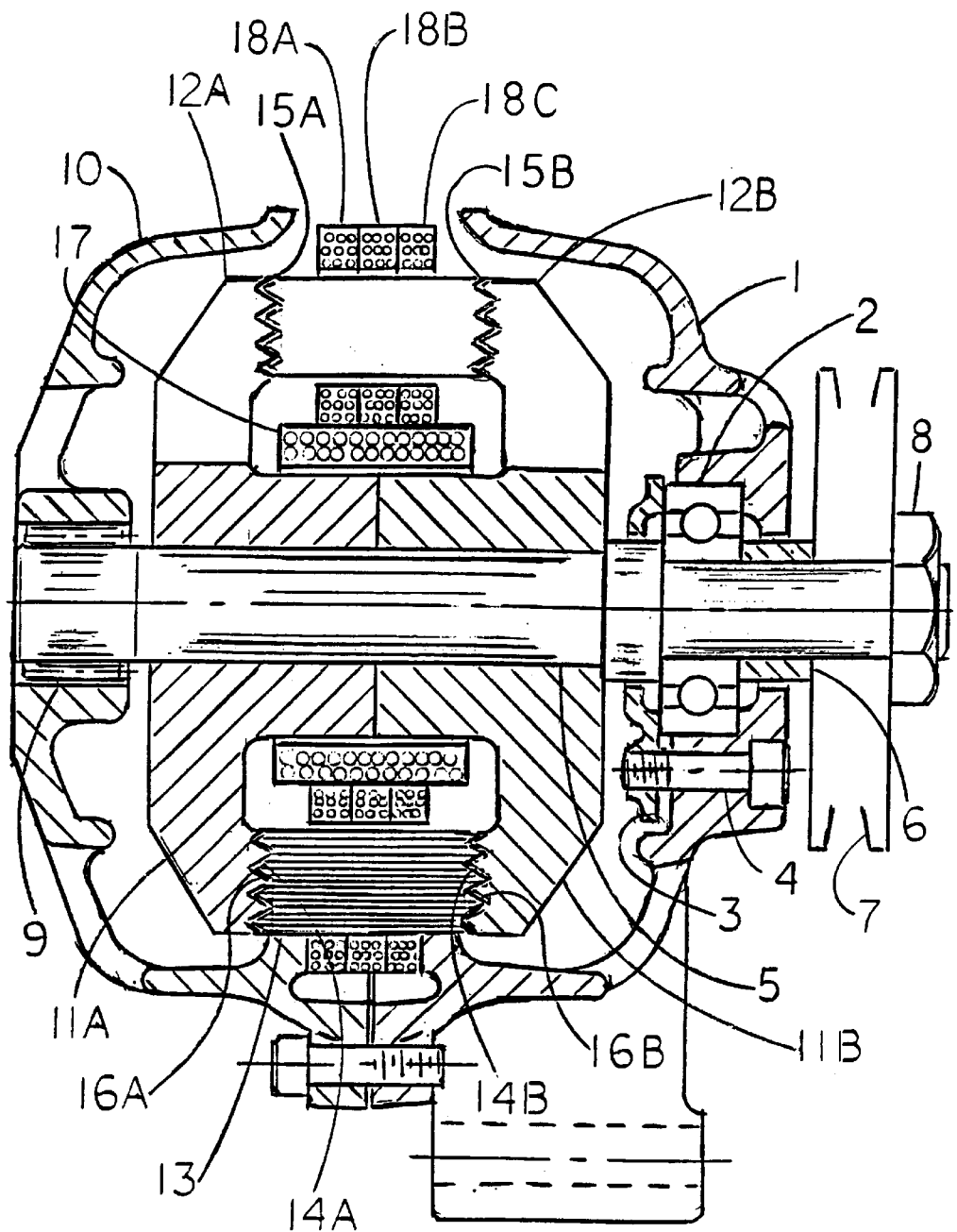
FIG. 1 is a front, cross-section drawing of a disc-type brushless alternator having two air gaps between the rotor and stator sections.

The invention is further described by reference to the appended drawings taken in conjunction with the following description where:

FIG. 1 shows an improved disc-type brushless alternator which generates a 12 volt DC current, wherein said alternator contains two housing units (1 and 10). Attached to housing units (1 and 10) is stator section 13. Stator section has serrated surfaces (14A and 14B). Shaft 5 is rotatably connected to housing units (1 and 10) by rotation means 2 at one end which comprises two ball bearing and and by roller bearings 9 at the other end. Pulley end bracket 1 contains ball bearings 2 which is clamped and held in place by bearing cap 3 and screw 4. Shaft 5 is clamped in place by spacer 6 and pulley 7 is secured on shaft 5 by thread with end nut 8.

Rotor sections (11A and 11B) are secured to shaft 5 with a press fit. Rotor sections (11A and 11B) contain magnetic poles (12A and 12B) which have the opposite magnetic polarities.

Stator section has serrated surfaces (14A and 14B). Axial air gaps (15A and 15B) separate stator section 13 from rotor sections (11A and 11B) which have serrated surfaces (16A and 16B). Field coil 17 is secured in place by stator coil windings (18A, 18B and 18C).

When a current flows through field coil 17 it produces lines of force in rotor sections (11A and 11B). Poles on one rotor section 11A are north while poles on the other rotor section 11B are south. These lines of force travel through stator section 13 making a complete circuit.

When pulley 7 is rotated by a rotating force, for example a fan belt (not shown), then rotor sections (11A and 11B) revolve, lines of force cut through stator section 13 generating EMF in stator coil windings (18A, 18B and 18C). the more cutting lines of force through the stator sections, the higher the EMF produced.

Figure 2:
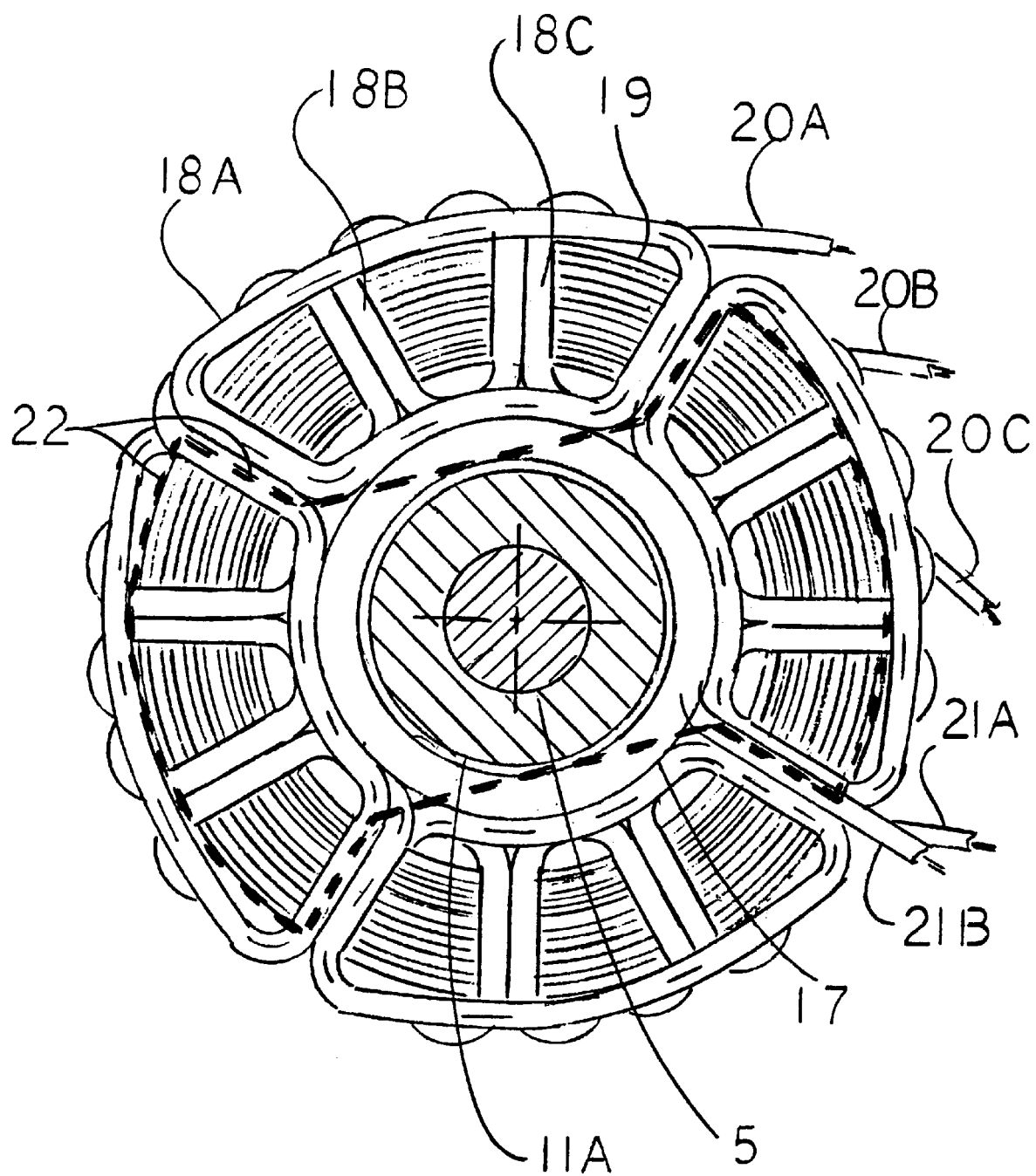
FIG. 2 is a front, cross-section drawing of the disc-type brushless alternator shown in FIG. 1.

FIG. 2 is a front sectional view of the disc-type, brushless alternator herein, wherein rotor section 11A is secured to shaft 5 with a press fit. Rotor 11A is free to rotate in stationary field coil 17 that is secured in place by stator coil windings (18A, 18B, and 18C) which wind around and between stator section poles 19 connected to wire leads (20A, 20B and 20C). Two lead metal wires (21 A and 21 B) from field coil 17 pass through space between stator section poles 19. As poles 22 on rotor section 11A revolve and conduct lines of force to stator poles 19, etc., an EMF is generated in stator coil windings (18A, 18B and 18C.)

Figure 3:
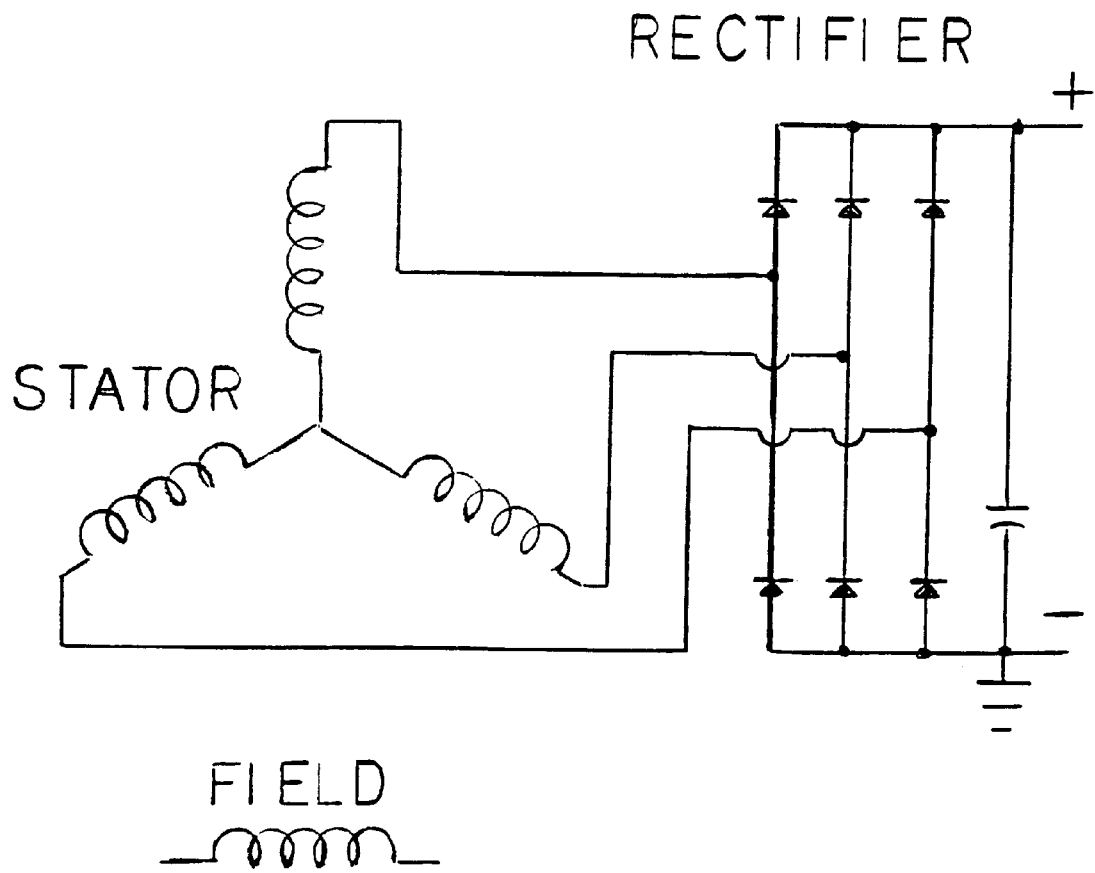
FIG. 3 is a partial connection diagram of FIG. 2 showing wound stator coils, field wound coil and six rectifiers for producing DC output voltage.
Figure 4:
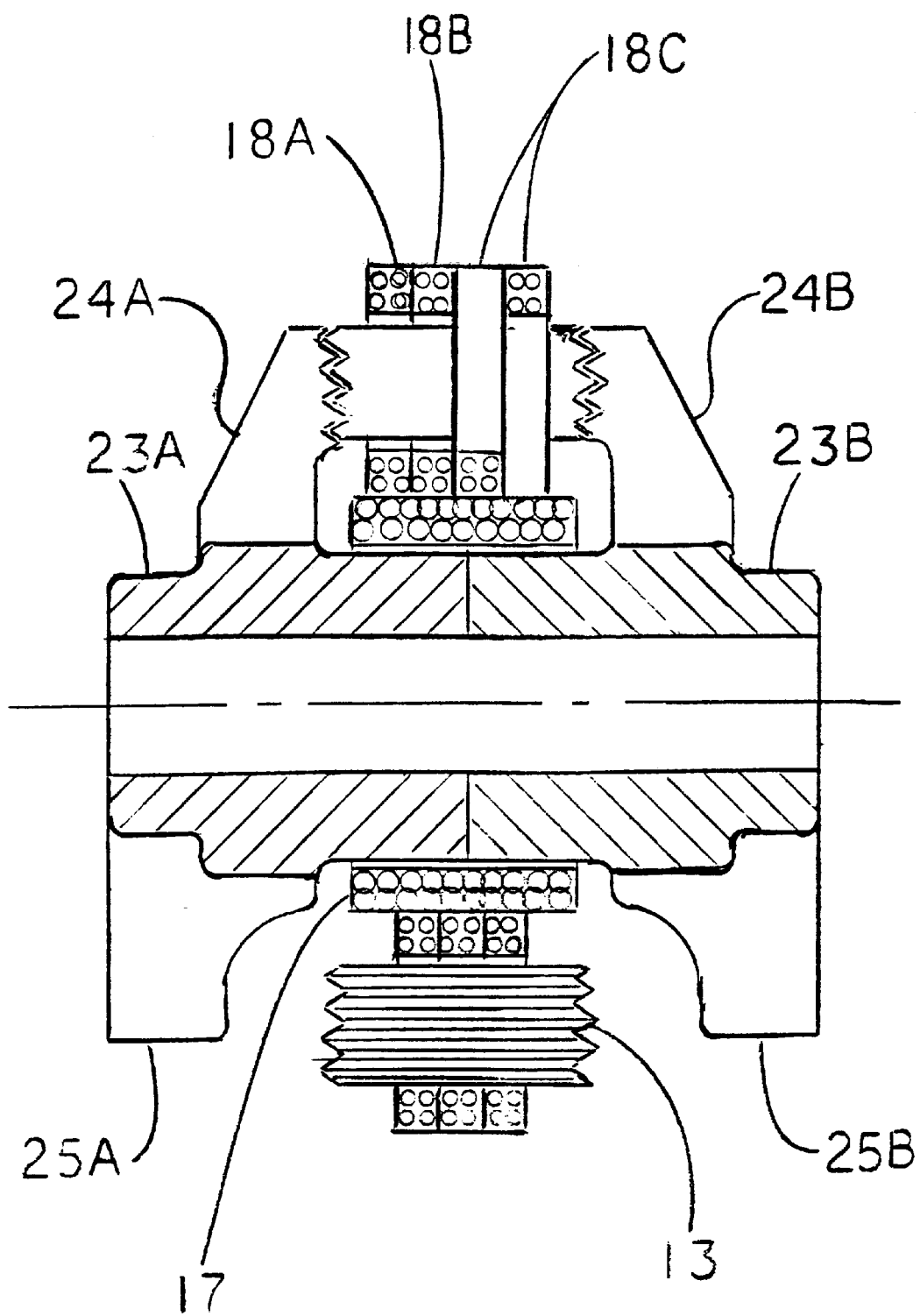
FIG. 4 is a partial, cross-section view without the housing unit and showing a 2 pole, three phrase brushless alternator having rotor sections with counter balance.

FIG. 3 is a schematic diagram of a cut-away stator section showing the electrical connections of said stator section to six standard rectifiers. The rectifiers convert electrical current produced in said stator section to DC electrical voltage. FIG. 4 is a partial, cross-sectional assembly drawing of a disc-type, brushless alternator showing rotor sections for 2 pole wound stator sections. Each rotor section (23A and 23B) with one magnetic pole, (24A and 24B) carrying lines of force and one pole (25A and 25B) for counter balance wherein each rotor section has magnetic poles with the same polarity, the magnetic polarity of each rotor section is opposite from the other rotor section and each rotor section has projection hubs which rotate in a field coil. Also shown in stator section 13, field coil 17 and stator coil windings (18A, 18B and 18C). Stator section 13 has two serrated face areas that situated opposite each other and the two serrated face areas have opposite magnetic polarities.

It should be noted that the magnetic poles and serrated faces of the rotor sections herein are easily manufactured as a P/M casting requiring a finish bore. A method for producing the magnetic poles and serrated faces of the stator sections of a disc-type, brushless alternator herein comprises winding a ribbon of sheet steel on an arbor with cut away sections for torch cutting, lightly clamping with a chuck containing as many jaws as cut away sections around the roll of sheet steel, pressing serrations in the sheet steel roll clamping the sheet steel roll firmly in place while a torch cuts the roll forming spaces for stator coil windings, fusing the edges of the sheet steel roll together, while torch cutting, completing a stator section with serrated surfaces on each end of said roll.

Obviously, many modifications and variations of the invention, as hereinbefore set forth, may be made without departing from the spirit and scope thereof, and therefore, only such limitations should be imposed as are indicated in the appended claims.

What is claimed is:

1. An improved disc-type brushless alternator having stator and rotor sections separated by axial air gaps with a non rotating inner field coil attached to the stator section with lead wires passing through stator slots in the stator section, wherein the stator section is attached to a housing unit, a shaft is rotatably attached to the housing unit with rotation means, rotor sections are attached to the shaft, wherein each rotor section has magnetic poles with the same polarity of each rotor section is opposite from the other rotor section, each rotor section has two magnetic poles, one carrying lines of force and one for counter balance, the stator section has two serrated face areas which are opposite each other and each serrated face area has magnetic polarities opposite each other, and each rotor section has projecting hubs which rotate within the field coil.

2. An improved disc-type brushless alternator having three wound stator sections and four rotor sections mounted on a shaft with magnetic poles in line, the wound stator sections are wound for single phase operation with magnetic poles 120° apart between each wound stator section, wherein the stator and rotor sections are separated by axial air gaps with a non-rotating inner field coil attached to the stator section with lead wires passing through stator slots in the stator section, wherein the stator section is attached to a housing unit, a shaft is rotatably attached to the housing unit with rotation means, rotor sections are attached to the shaft, wherein each rotor section has magnetic poles with the same polarity and the magnetic polarity of each rotor section is opposite from the other rotor section, the stator section has two serrated face areas which are opposite each other and each serrated face areas have magnetic polarities opposite each other; and each rotor section has projecting hubs which rotate within the field coil.

* * * * *